US010347217B2

(12) United States Patent
Angadimani et al.

(10) Patent No.: US 10,347,217 B2
(45) Date of Patent: Jul. 9, 2019

(54) PLACEMENT OF GRAPHIC ELEMENTS OF GUI WITH REGION OF INTEREST

(71) Applicant: Intel Corporation, Santa Clara, CA (US)

(72) Inventors: Raghavendra Angadimani, Bangalore (IN); Sean J. Lawrence, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 271 days.

(21) Appl. No.: 15/242,164

(22) Filed: Aug. 19, 2016

(65) Prior Publication Data

US 2018/0052568 A1    Feb. 22, 2018

(51) Int. Cl.
*G06F 3/0484* (2013.01)
*G09G 5/14* (2006.01)
*G09G 5/377* (2006.01)

(52) U.S. Cl.
CPC .......... *G09G 5/14* (2013.01); *G06F 3/04842* (2013.01); *G06F 3/04845* (2013.01); *G09G 5/377* (2013.01); *G09G 2340/12* (2013.01); *G09G 2354/00* (2013.01)

(58) Field of Classification Search
CPC .............................. G06F 1/3287; G11B 27/34
USPC .................................................. 715/761–765
See application file for complete search history.

(56) References Cited

U.S. PATENT DOCUMENTS 7,860,309 B1 * 12/2010 Bodnar .............. G06K 9/00677
358/538
2016/0241784 A1 * 8/2016 Baek ..................... G06F 1/3287
2017/0125064 A1 * 5/2017 Aggarwal .............. G11B 27/34

* cited by examiner

*Primary Examiner* — Cao H Nguyen
(74) *Attorney, Agent, or Firm* — Schwabe, Williamson & Wyatt, P.C.

(57) ABSTRACT

Apparatuses, methods, and storage media associated with placing graphical elements in a graphical user interface (GUI) in view of a region of interests (ROI) are disclosed herein. An apparatus may comprise a GUI manager to receive a designation of a region of interest, ROI, of a first graphical element of a GUI to be rendered on a display device; and to place a second graphical element into the GUI in view of the ROI of the first graphical element. The GUI manager may be loaded into the memory and executed by the processor circuitry of a computing device. The first graphical element may have one or more ROIs, and there may be one or more instances of the first graphical element, placed over one or more display devices.

24 Claims, 8 Drawing Sheets

(i)

(ii)

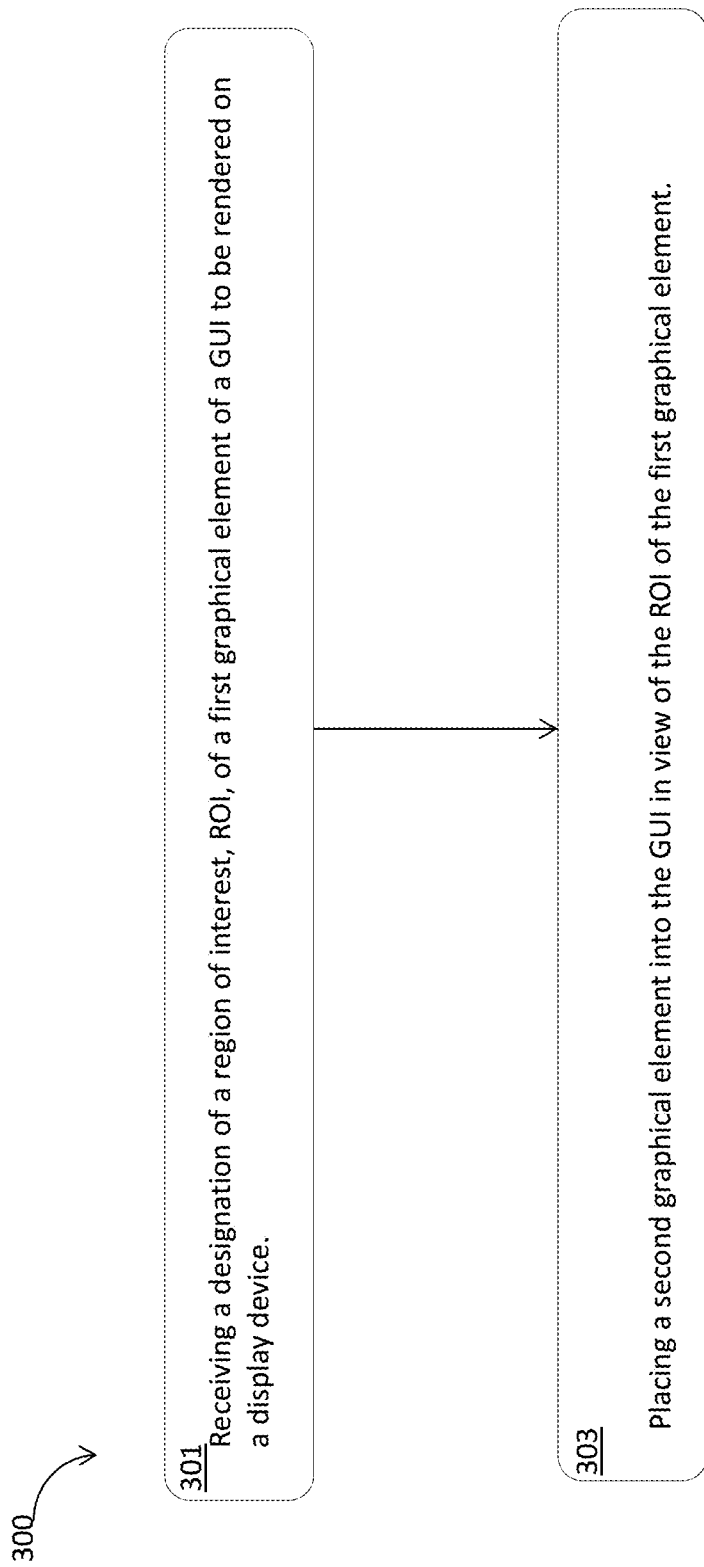
Figure 3(a) Generic flow for icon/widget positioning based on ROI selection.

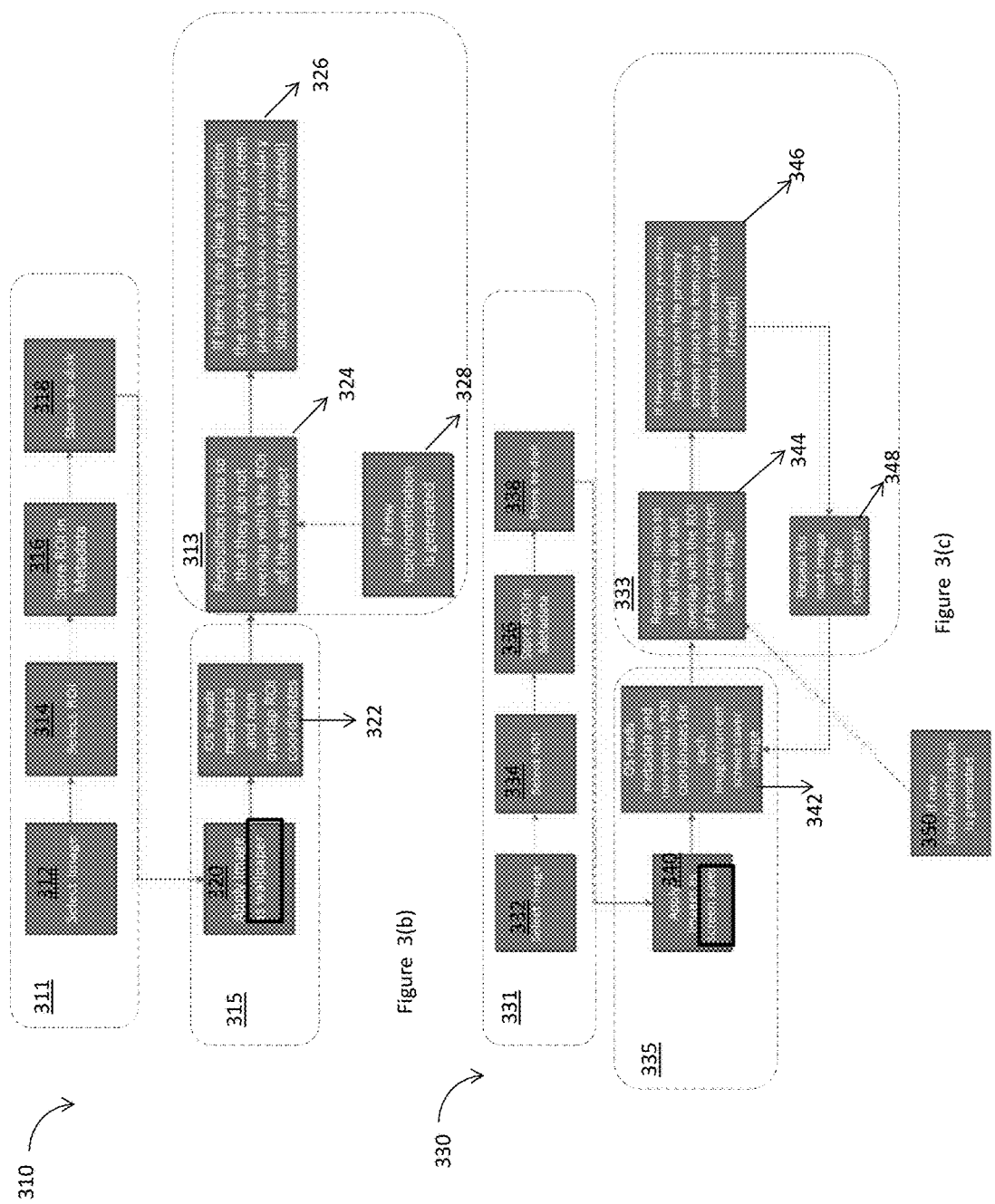

PLACEMENT OF GRAPHIC ELEMENTS OF GUI WITH REGION OF INTEREST

TECHNICAL FIELD

The present disclosure relates to the fields of computing. In particular, the present disclosure relates to placements of graphical elements of a GUI with regions of interest.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In computing, a graphical user interface (GUI), is a type of user interface that allows users to interact with electronic devices through graphical elements, such as icons, glyphs, visual indicators, and so forth, instead of text-based user interfaces, typed command labels, or text navigation. The actions in a GUI may usually be performed through manipulation of the graphical elements of the GUI. A GUI makes it easier for people with few computer skills to work with and use computer software. Beyond computers, GUIs may be used in many handheld mobile devices such as MP3 players, portable media players, gaming devices, smartphones, and smaller household, office and industrial equipment. A GUI may be an interface to a standalone device, e.g., a desktop environment in a computing device. In addition, a GUI may also be used in web applications or other client-server software applications.

Often a GUI may have graphical elements placed in multiple layers. For example, a GUI for a desktop of a computing device may include some graphical elements placed in a background layer, or a screensaver layer for entertainment purposes, while some other graphical elements placed in the foreground of the desktop for functional purposes. Often the background layer of a desktop, also called wallpaper, may have a configurable option so that a user may select images or other graphical elements to be displayed in the background layer or the screensaver layer. However, a GUI manager or other software, such as an operating system, may sometimes place other graphical elements, such as icons, shortcut, windows, over the images in the background layer, without regard for the content of the image. When a user selects an image to be placed in the background layer, the user may intend to view the image, or a region of interest of the image, without blemish. When other icons are placed or rendered over the image or over the region of interest of the image, the user may have a bad or irritating user experience. Often the user may manually move icons placed over the region of interests of the image away to view the image or a region of interest of the image in the background layer.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIGS. 3(a)-3(d) illustrate example processes for placing graphical elements in a GUI in view of a ROI, in accordance with various embodiments.

DETAILED DESCRIPTION

Figure 1:
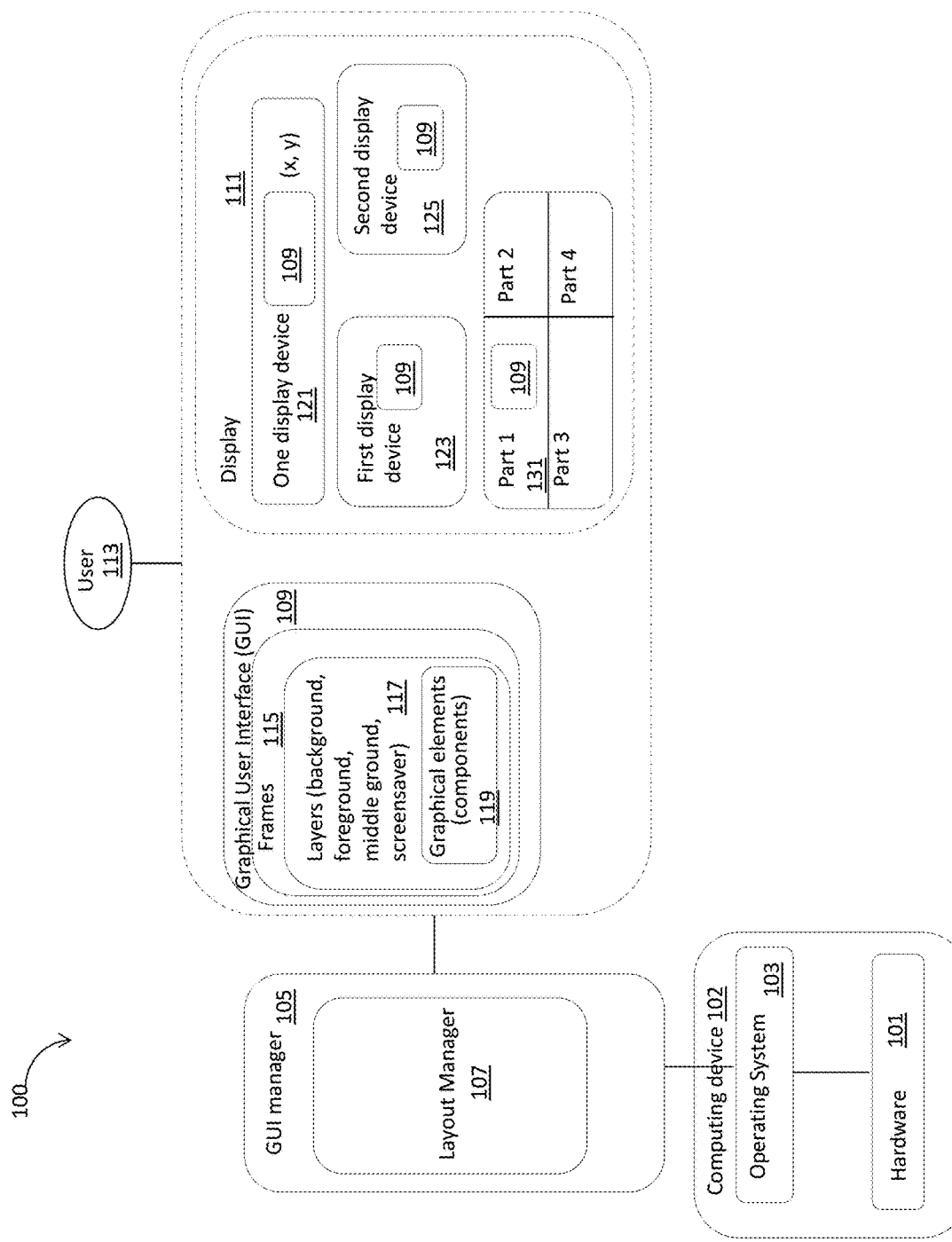
FIG. 1 illustrates an example block diagram of a system containing a graphical user interface (GUI), together with details of the GUI, in accordance with various embodiments.

Apparatuses and methods are disclosed herewith related to placements of graphical elements of a GUI. For ease of understanding, the remaining description will frequently refer to a GUI for a desktop computing device. Those skilled in the art would appreciate that the GUI for a desktop computing device may be for illustrations only and is not limiting, and the present disclosure may be applied to GUIs over other computing devices in various settings, e.g., a GUI for web software.

Often a GUI may have graphical elements placed on multiple layers, such as a background layer, a foreground layer, or a screensaver layer. When a user selects a graphical element to be placed in the background layer or the screensaver layer, the user may intend to have certain area of the graphical element, e.g., one or more region of interests (ROIs), to be visible. However, due to the limited area of a display device, other graphical element of the GUI may be placed over the ROI of the graphical element of the GUI in the background layer or the screensaver layer, causing a bad user experience.

Embodiments herein may include a first graphical element of a GUI with one or more ROIs to be rendered on a display device, and a second graphical element of the GUI placed in view of the one or more ROIs of the first graphical element. For example, the second graphical element may be placed over a part of the first graphical element, while the one or more ROIs of the first graphical element remain visible. By allowing a certain overlap of the second graphical element over the first graphical element, embodiments herein can save screen area for placing more graphical elements. On the other hand, by keeping the one or more ROIs of the first graphical element visible when placing the second graphical element, the user may have a more pleasant user experience. Embodiments herein may not be limited to the one or more ROIs of the first graphical element in a background layer or a screensaver layer, instead the first graphical element may be in any layer of the GUI.

Embodiments herein may include a GUI manager to be loaded into a memory and executed by a processor circuitry to receive a designation of a ROI of a first graphical element of a GUI to be rendered on a display device; and to place a second graphical element into the GUI in view of the ROI of the first graphical element. For example, the second graphical element may be placed into the GUI in a manner where the ROI of the first graphical element remains visible. Furthermore, the first graphical element may have one or more ROIs, and one or more instances of the first graphical element may be placed in one or more screen areas of the display device. The second graphical element may be placed in view of the one or more ROIs of the first graphical element, for each of the one or more instances of the first graphical element.

Furthermore, in embodiments, the processor circuitry and the display device for placing the graphical elements may be a part of a computing device, such as a desktop, a laptop, a mobile device, a music player, or a smart phone, among others. The GUI manager may be a part of an operating system of the computing device. In addition, the GUI may span on one or more display devices. A first instance of the first graphical element may be placed at a first screen area on the first display device, and a second instance of the first graphical element may be placed in a second screen area on a second display device. A third graphical element may be placed on a portion of the GUI on the second display device in view of the ROI of the second instance of the first graphical element, in a manner where the ROI of the second instance of the first graphical element remains visible. Alternatively, the first graphical element may be placed at a screen area on the first display device, but not on any screen area on the second display device, and a third graphical element may be placed on a portion of the GUI on the second display device independent of the ROI of the first graphical element.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A or B" and "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

FIG. 1 illustrates an example block diagram of a system 100 containing a graphical user interface (GUI) 109 to a user 113, together with details of the GUI 109, and related aspects, in accordance with various embodiments. The GUI 109 may be managed by a GUI manager 105 of operating system 103 of a computing device 102. The GUI manager 105 may be configured with the graphic elements placement technology of the present disclosure to place graphics elements into a GUI with regions of interest.

In embodiments, the GUI 109 may be an interface to the user 113 for a computing device 102. In embodiments, the computing device 102 may include an operating system 103 and a hardware 101. The hardware 101 may include memory devices and a processor circuitry. The computing device 102 may be a desktop, a laptop, a mobile device, a music player, or a smart phone, among others. The operating system 103 may be Windows®, Android OS, or iOS, among others.

In embodiments, the GUI manager 105 of the computing device 102 may manage various aspects, such as the appearance and functions, of the GUI 109 to be displayed on the screen space of the display 111. In order to display a number of graphical elements, the GUI manager 105 may implement different solutions for screen space management for different applications and devices. In alternate embodiments, the GUI manager 105 may be a standalone part, as opposed to a part of the operating system 103 of the computing device 102. In embodiments, the GUI manager 105 may be loaded into the memory and executed by the processor circuitry of the hardware 101.

In embodiments, the GUI manager 105 may include a layout manager 107. For example, the layout manager 107 may control placement and sizing of graphical elements. There may be various layout managers implemented. For example, the layout manager 107 may be a border layout manager, a box layout manager, a flow layout manager, a grid bag layout manager, or a grid layout manager, among others.

In embodiments, the GUI 109 may include frames 115, layers 117, graphical elements or components 119, which may be managed by the GUI manager 105 or the layout manager 107 in particular. For example, the frames 115 may be the border of a window that may hold all the graphical elements of the GUI 109. When a graphical element is contained in a frame, it may also be called as a component of the frame. In embodiments, the frames 115 may include various layers 117, such as a background layer, a foreground layer, a middle ground layer, a screensaver layer, among others. In embodiments, a background layer can also be known as wallpaper, a desktop wallpaper, desktop background, desktop picture, or desktop image on computers. Often the background layer may be a digital image, a photo, a drawing etc., used for decorative purposes. On a computer the background layer may usually be for the desktop, while on a mobile phone it may usually be the background for the "home" or "idle" screen. Though most devices come with a default picture, users can usually change it to custom files of their choosing to be displayed on the background layer.

Various graphical elements 119 may be placed on the layers 117 within the frames 115. When a graphical element 119 is placed within a frame, it may also be called a component of the frame. In embodiments, the graphical elements 119 may include a window, an icon, a menu, a pointer, a widget, a label, a folder, a toolbar, or a button, among others. One common combination of such graphical elements 119 in the GUI 109 may be the windows, icons, menus, pointer (WIMP) paradigm, as often used in personal computers.

For example, a window may run a self-contained program, isolated from other programs that (if in a multi-program operating system) run at the same time in other windows. An icon may act as a shortcut to an action the computer performs (e.g., execute a program or task). A menu may be a text or icon-based selection system that selects and executes programs or tasks. A pointer may be an onscreen symbol that represents movement of a physical device that the user controls to select icons, data elements, etc.

The GUI 109 may be displayed on a display 111, where the GUI manager 105 may manage the placements of graphical elements 119 onto the display 111 using various screen space management techniques, in particular, the region of interest technique. The display 111 may include one display device 121, which may be called a monitor or a screen. Additionally and alternatively, the display 111 may include more than one display devices, such as a first display device 123, and a second display device 125. In embodiments, the first display device may be called as a primary display device, or a primary screen, while the second display device may be called a secondary display device, or a secondary screen. In some embodiments, the display 111 can be a part of a display device, such as a part 131. In embodiments, display device 121 may have a scrolling screen display and selectable tabs displaying groups of related graphic elements 119 of the GUI 109.

In embodiments, a display device, such as the display device 121, may use coordinates, e.g., (x, y) coordinates, to identify a location of a point on the display device. For example, a point (x, y) may be located x pixels to the right and y pixels down from the top-left corner of the display devices.

Figure 2A:
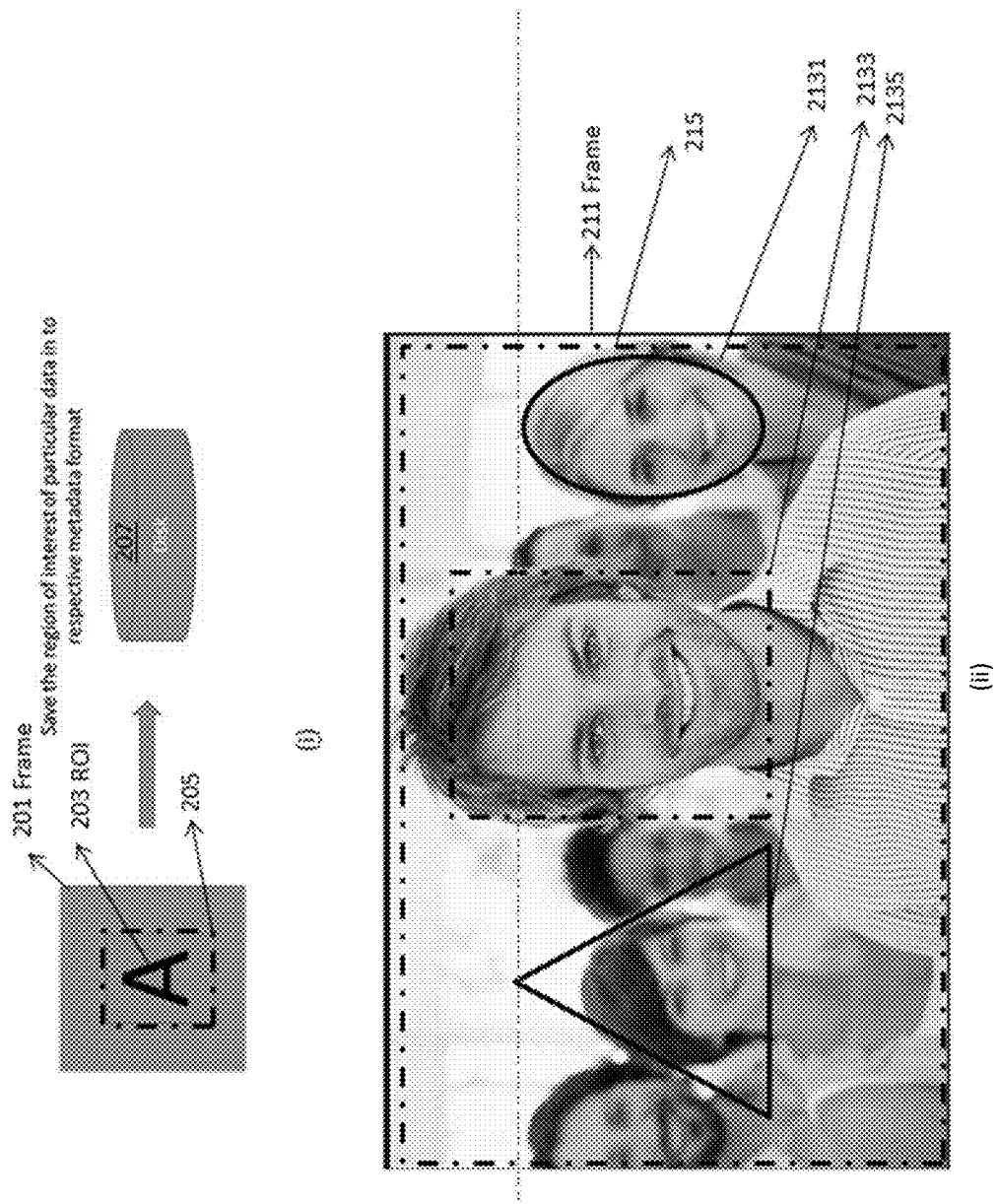
FIGS. 2(a)-2(c) illustrate example graphic elements of a GUI, with region of interests (ROIs), displayed on display devices, in accordance with various embodiments.
Figure 2B:
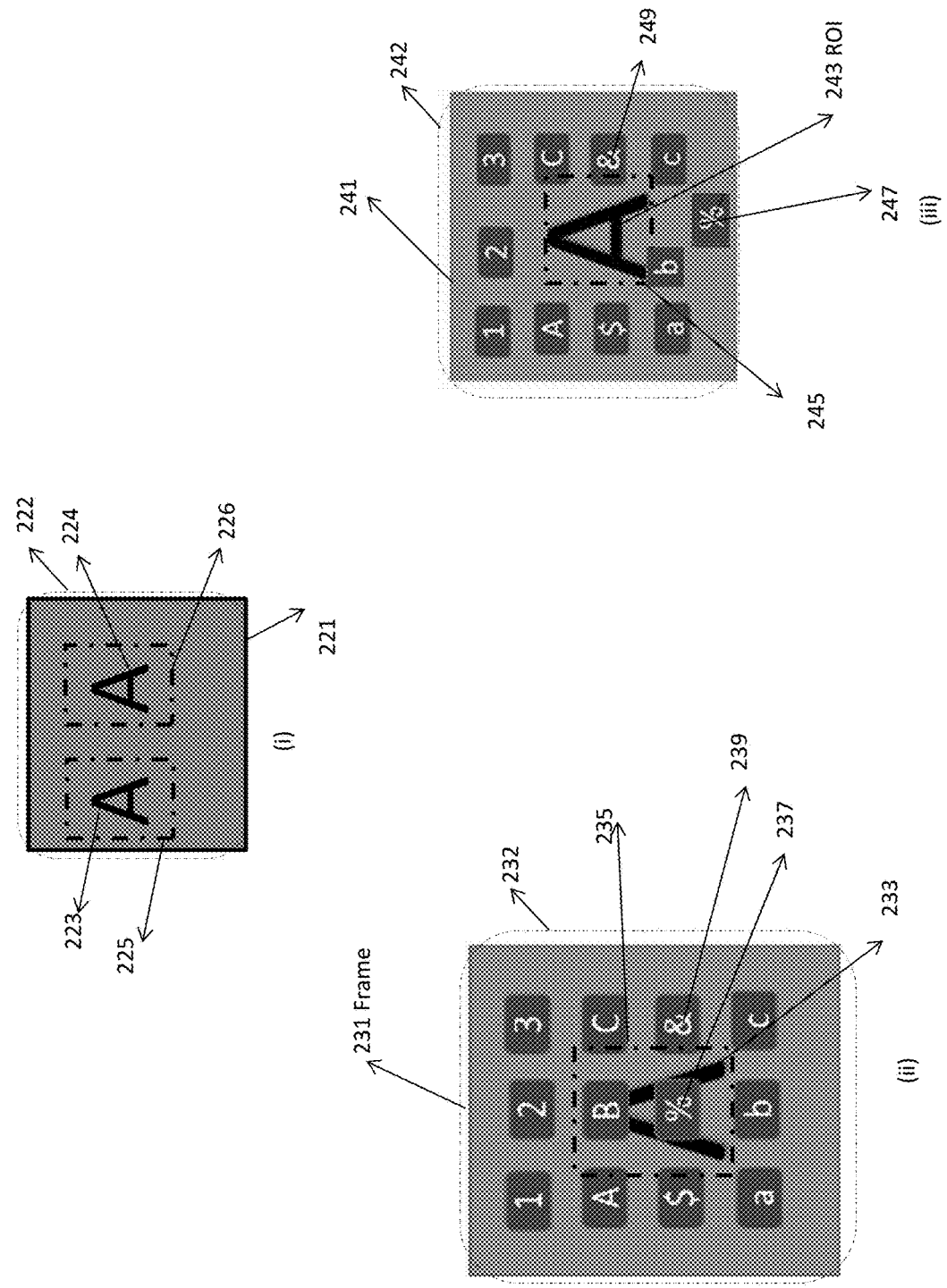

FIGS. 2(a)-2(c) illustrate example graphic elements of a GUI, with region of interests (ROIs), displayed in display devices, in accordance with various embodiments. The graphical elements shown in FIGS. 2(a)-2(c) may be examples of the graphical elements 119 of FIG. 1.

FIG. 2(a)(i) illustrates a graphical element 205 within a frame 201. The graphical element 205 may include a region of interest (ROI) 203, shown as "A". In embodiments, the ROI 203 may be a subset of the graphical element 205. The graphical element 205 with the ROI 203 may be in a layer of the frame 201. For example, the graphical element 205 may be in a background layer or a screensaver layer.

In embodiments, the ROI 203 may be identified or marked by a user. The ROI 203 of the graphical element 205 may be represented by metadata to identify a relative position of the ROI 203 with respect to the graphical element 205. A relative position of the ROI 203 with respect to the graphical element 205 may be a relative scale of the length or width of the ROI, instead of the coordinate (x, y) in a display device. The metadata representing the relative position of the ROI 203 may be stored in storage, e.g., disk 207, which may be a part of the computing device 102 as shown in FIG. 1. Alternatively, the metadata representing the relative position of the ROI 203 may be stored in other locations such as in the cloud, not shown. When placing the graphical element 205 with ROI 203 on a display device, a GUI manager may receive metadata associated with the graphical element 205 representing a relative position of the ROI 203 with respect to the graphical element 205.

FIG. 2(a)(ii) illustrates a graphical element 215 within a frame 211, where the graphical element 215 may be a photo or an image. The graphical element 215 may include more than one ROI. For example, there may be a ROI 2131, a ROI 2133, and a ROI 2135, where the ROI 2131, the ROI 2133, and the ROI 2135 are heads of people. In addition, multiple ROIs may be of different shapes and sizes. For example, the ROI 2131 may be of a circle shape, the ROI 2133 may be of a rectangle shape, while the ROI 2135 may be of a triangle shape. There may be other number of ROIs of a graphical element, and of other kinds of regular or irregular shapes, which can be decided by a user choosing the ROIs, or generated by a computer using algorithms.

FIG. 2(b)(i) illustrates a frame 221 placed on a display device 222, where the frame 221 may include more than one instances of a graphical element with an ROI. In operation, a GUI manager may render a graphical element with a ROI onto a display device. In embodiments, for a graphical element with one or more ROIs, the GUI manager may render multiple instances onto the display device. For example, a first instance 225 of a graphical element having a first ROI 223 may be located at a first screen area, and a second instance 226 of the graphical element having a second ROI 224 may be located in a second screen area on the display device 222.

When a graphical element is in a background layer or a screensaver layer, the graphical element may cover a large part of the screen of the display device. Additional graphical elements placed on the display device may overlap with the graphical element in the background layer or the screensaver layer. While certain overlap of additional graphical elements over the graphic element in the background layer or the screensaver layer is tolerable, graphical elements placed over the ROI of the graphical element in the background layer may lead to a bad user experience.

FIG. 2(b)(ii) illustrates a frame 231 placed on a display device 232, where the frame 231 may include a graphical element 235 with a ROI 233. In addition, other graphical elements, such as a graphical element 237 and a graphical element 239 may be placed into the frame 231 on the display device 232. For example, the graphical element 239 may overlap with the graphical element 235, without overlapping with the ROI 233. On the other hand, the graphical element 237 may overlap with the ROI 233. The graphical element 239 may be tolerable to a user, but the graphical element 237 placed over the ROI 233 may lead to a bad user experience.

FIG. 2(b)(iii) illustrates a frame 241 placed on a display device 242, where the frame 241 may include a graphical element 245 with a ROI 243. In addition, other graphical elements, such as a graphical element 247, and a graphical element 249 may be placed into the frame 231. To have a better user experience, in embodiments, the graphical element 247 may be placed in view of the ROI 243 of the graphical element 245. For example, the graphical element 247 may be placed non-overlap with the graphical element 245. In some embodiments, the graphical element 249 may be placed in view of the ROI 243, where the graphical element 249 may overlap with the graphical element 245, but the ROI 243 of the graphical element 245 may remain visible. In embodiments, the ROI 243 may remain visible when the graphical element 249 does not have any overlap with the ROI 243. Additionally and alternatively, the ROI 243 may remain visible even when the graphical element 249 has some overlap with the ROI 243. The exact amount of overlap allowed between the graphical element 249 and the ROI 243 to still have a good user experience may be determined by the actual application and devices. In embodiments, the graphical element 249 and the graphical element 245 may be in different layers of the frame 241. In embodiments, there may be more than instances of the graphical element 245, each with one or more ROIs, while the GUI manager may place other graphical elements in view of the one or more ROIs of multiple instances of the graphical element 245.

FIG. 2(c)(i) illustrates a frame 251 placed on multiple display devices, such as a first display device 2522, and a second display device 2524. A first instance 2551 of a graphical element may be located at a first screen area on the first display device 2522, and a second instance 2553 of the graphical element may be located in a second screen area on the second display device 2524. The first instance 2551 may have a first ROI 2531, and the second instance 2553 may have a second ROI 2533. Additional graphical elements may be placed into the frame 251 on the first display device 2522, and/or the second display device 2524. For example, a graphical element 2571 may be placed on a portion of the frame 251 on the first display device 2522 in view of the ROI 2531 of the first instance 2551. In embodiments, the graphical element 2571 may be placed on the portion of the frame 251 on the first display device 2522 in a manner where the ROI 2531 of the first instance 2551 of the graphical element remains visible. In addition, a graphical element 2573 may be placed on a portion of the frame 251 on the second display device 2524 in view of the ROI 2533 of the second instance 2553. For example, the graphical element 2573 may be placed on the portion of the frame 251 on the second display device 2524 in a manner where the ROI 2533 of the second instance 2553 of the graphical element remains visible.

FIG. 2(c)(ii) illustrates a frame 261 placed on multiple display devices, such as a first display device 2622, and a second display device 2624. In embodiments, only one instance 2651 of a graphical element may be located at a first screen area on the first display device 2622, without having a second instance of the graphical element located on the second display device 2624. The instance 2651 may have a ROI 2631. Additional graphical elements may be placed into the frame 261 on the first display device 2622, and/or the second display device 2624. For example, a graphical element 2671 may be placed on a portion of the frame 261 on the first display device 2622 in view of the ROI 2631 of the instance 2651. In embodiments, the graphical element 2671 may be placed on the portion of the frame 261 on the first display device 2622 in a manner where the ROI 2631 of the instance 2651 remains visible. In addition, a graphical element 2673 may be placed on a portion of the frame 261 on the second display device 2624 independent of the ROI 2631 of the instance 2651.

FIGS. 3(a)-3(d) illustrate example processes for placing graphical elements into a GUI in view of ROI, in accordance with various embodiments. The processes may be performed e.g., by a GUI manager, such as the GUI manager 105 shown in FIG. 1. In operation, the GUI manager may be loaded into memory and executed by a processor circuitry of hardware of a computing device, such as the hardware 101 of the computing device 102 as shown in FIG. 1.

FIG. 3(a) illustrates an example process 300 for placing graphical elements into a GUI in view of a ROI, in accordance with various embodiments. The process may comprise: receiving a designation of a ROI of a first graphical element of a GUI to be rendered on a display device (301); and placing a second graphical element into the GUI in view of the ROI of the first graphical element (303).

In embodiments, the second graphical element may be placed into the GUI in view of the ROI of the first graphical element, so that the ROI of the first graphical element remains visible, as shown in FIGS. 2(b)(iii), 2(c)(i), and 2(c)(ii). In embodiments, the first graphical element may be located in a layer of a frame of the GUI, such as a background layer or a screensaver layer of a frame of the GUI. A more detailed process for placing graphical elements in view of a ROI at a background layer is shown in FIG. 3(b), and a more detailed process for placing graphical elements in view of a ROI at a screensaver layer is shown in FIG. 3(c).

Figure 3D:
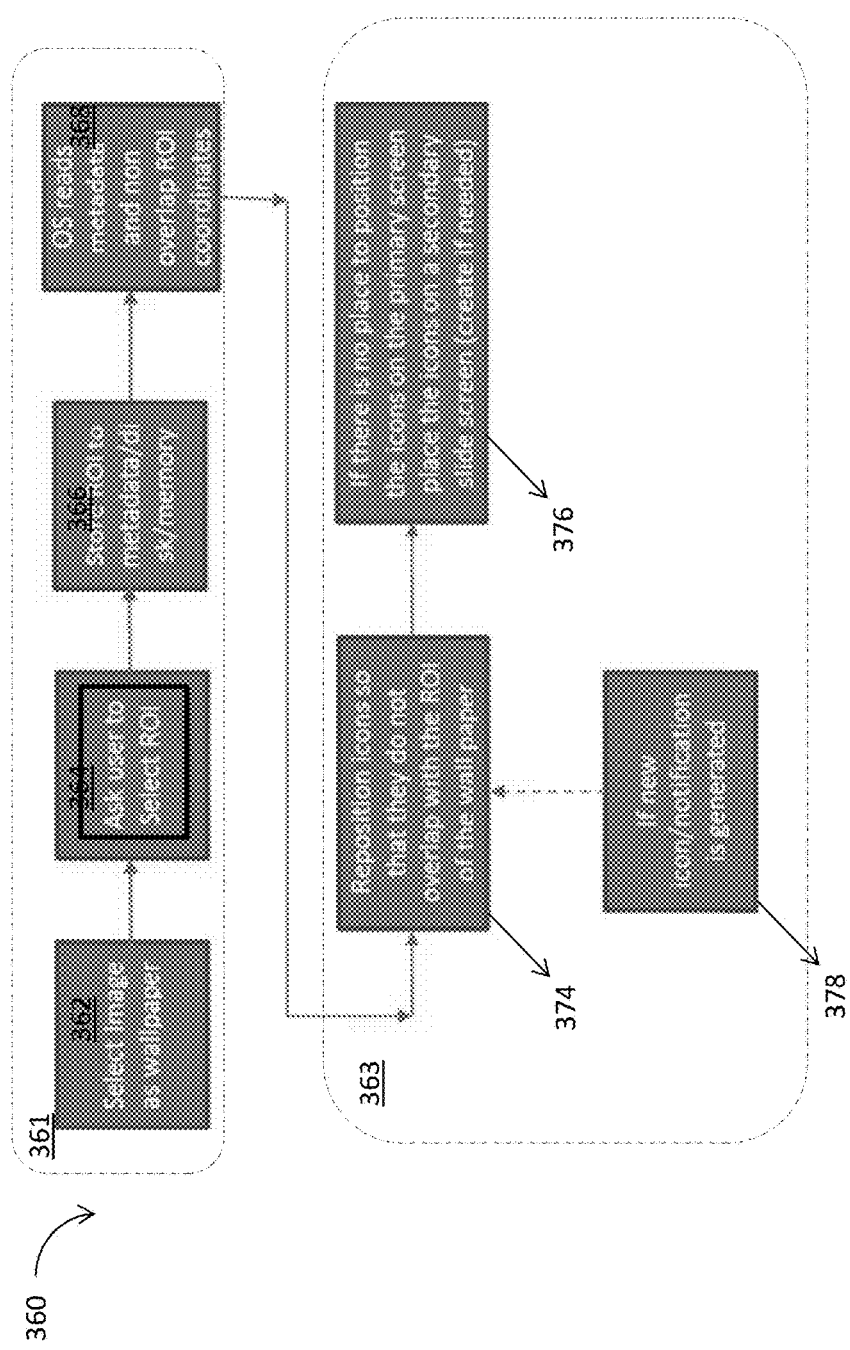

In embodiments, the designation of a ROI of the first graphical element may be performed by a user at various times. For example, FIGS. 3(b)-3(c) illustrate more detailed processes when the ROI may be selected manually in images or graphical elements that are later used for wallpapers, or screensavers. Additionally and alternatively, as shown in FIG. 3(d), a ROI may be selected by a user during the process of setting an image for a background layer. Furthermore, the designation of a ROI of the first graphical element may be performed by a computing device, instead of selected manually by a user.

FIG. 3(b) illustrates a more detailed process 310 for placing graphical elements in a GUI in view of a ROI, in accordance with various embodiments. At block 311, the process 310 may designate a ROI of a graphical element of a GUI to be rendered on a display device, similar to the block 301 in FIG. 3(a). In details, the block 311 may comprise: selecting an image or a graphical element (312); selecting a ROI of the selected image or the selected graphical element (314); representing the relative position of the ROI with respect to the graphical element in metadata (316); and storing the metadata associated with the ROI and the graphical element into storage, e.g., a disk (318).

After the designation of a ROI of a graphical element of a GUI, at block 315, the process 310 may render the graphical element including the content of the graphical element within the ROI on a display device. For example, in details, the block 315 may comprise: applying the selected graphical element at a background layer (320), and the operating system or a GUI manager reading the metadata associated with the graphical elements and the ROI (322).

In addition, at block 313, the process 310 may place other graphical elements into the GUI in view of the ROI of the graphical element selected for the background layer, similar to the block 303 in FIG. 3(a). In more details, the block 313 may comprise: positioning other graphical elements or icons so that the ROI of the graphical element in the background layer remain visible or mostly visible (324), i.e., the other graphical elements do not overlap or insubstantially overlap with the ROI. The other graphical elements may be some existing graphical elements in the GUI before the graphical element and the ROI are selected in operation 312. Additionally, at block 328, when a new graphical element, e.g., an icon or an alert window, is generated after the graphical element and the ROI are selected, the new graphical element may be placed in view of the ROI. Furthermore, at block 326, when there are two display devices available, such as a primary screen and a secondary screen, as shown in FIGS. 2(c)(i) and 2(c)(ii), the block 326 may place a graphical element in the secondary screen when there is no space available on the primary screen, in view of the ROI of the graphical element in the background layer.

FIG. 3(c) illustrates still a more detailed process 330 for placing graphical elements in a screensaver layer of a GUI in view of a ROI, in accordance with various embodiments. At block 331, the process 330 may designate a ROI of a graphical element of a GUI to be rendered on a display device, similar to the block 301 in FIG. 3(a) and block 311 in FIG. 3(b). In details, the block 331 may comprise: selecting an image or a graphical element (332); selecting a ROI of the selected image or the selected graphical element (334); representing the relative position of the ROI with respect to the graphical element in metadata (336); and storing the metadata associated with the ROI and the graphical element into storage, e.g., a disk (338).

After the designation of a ROI of a graphical element of a GUI, at block 335, the process 330 may render the ROI and the graphical element on a display device, similar to block 315 shown in FIG. 3(b). For example, in details, the block 335 may comprise: applying the selected graphical element at a screensaver layer (340), and the operating system or a GUI manager reading the metadata associated with the graphical elements and the ROI (342).

In addition, at block 333, the process 310 may place other graphical elements into the GUI in view of the ROI of the graphical element selected for the screensaver layer, similar to the block 303 in FIG. 3(a) and block 313 in FIG. 3(b). In embodiments, at block 344, the process 310 may place other graphical elements or icons so that the ROI of the graphical element in the screensaver layer remain visible or mostly visible, i.e., the other graphical elements do not overlap or insubstantially overlap with the ROI. The other graphical elements may be some existing graphical elements in the GUI before the graphical element and the ROI are selected in operation 332. The operation in block 348 may repeat the operation in block 344 for more existing graphical elements in the GUI before the graphical element and the ROI are selected in operation 332. Additionally, at block 350, when a new graphical element, e.g., an icon or an alert window, is generated after the graphical element and the ROI are selected for the screensaver layer, the new graphical element may be placed in view of the ROI. Furthermore, at block 346, when there are two display devices available, such as a primary screen and a secondary screen, as shown in FIGS. 2(c)(ii) and 2(c)(ii), the process 310 may place a graphical element in the secondary screen when there is no space available on the primary screen, in view of the ROI of the screensaver layer.

FIG. 3(d) illustrates yet another more detailed process 360 for placing graphical elements in a background layer of a GUI in view of a ROI by a user during the process of setting an image for the background layer, in accordance with various embodiments.

At block 361, the process 360 may designate a ROI of a graphical element of a GUI to be rendered on a display device, similar to the block 301 in FIG. 3(a), the block 311 in FIG. 3(b), and the block 331 in FIG. 3(c). The block 311 may comprise: selecting an image or a graphical element (312); asking a user to select a ROI of the selected image or the selected graphical element (314); representing the relative position of the ROI with respect to the graphical element in metadata (316); and storing the metadata associated with the ROI and the graphical element into storage, e.g., a disk (318).

After the designation of a ROI of a graphical element of a GUI, not shown, the process 360 may render the ROI and the graphical element on a display device, as operations performed in FIGS. 3(b) and 3(c). For example, the process 360 may comprise: applying the selected graphical element at a background layer, and the operating system or a GUI manager reading the metadata associated with the graphical elements and the ROI.

In addition, at block 363, the process 360 may place other graphical elements into the GUI in view of the ROI of the graphical element selected for the background layer, similar to the block 303 in FIG. 3(a), the block 313 in FIG. 3(b), and the block 333 of FIG. 3(c). In embodiments, the block 363 may comprise: positioning other graphical elements or icons so that the ROI of the graphical element in the background layer remain visible (374). Additionally, at block 378, when a new graphical element, e.g., an icon or an alert window, is generated after the graphical element and the ROI are selected, the new graphical element may be placed in view of the ROI. Furthermore, at block 376, when there are two display devices available, such as a primary screen and a secondary screen, as shown in FIGS. 2(c)(ii) and 2(c)(ii), the process 360 may place a graphical element in the secondary screen when there is no space available on the primary screen.

Figure 4:
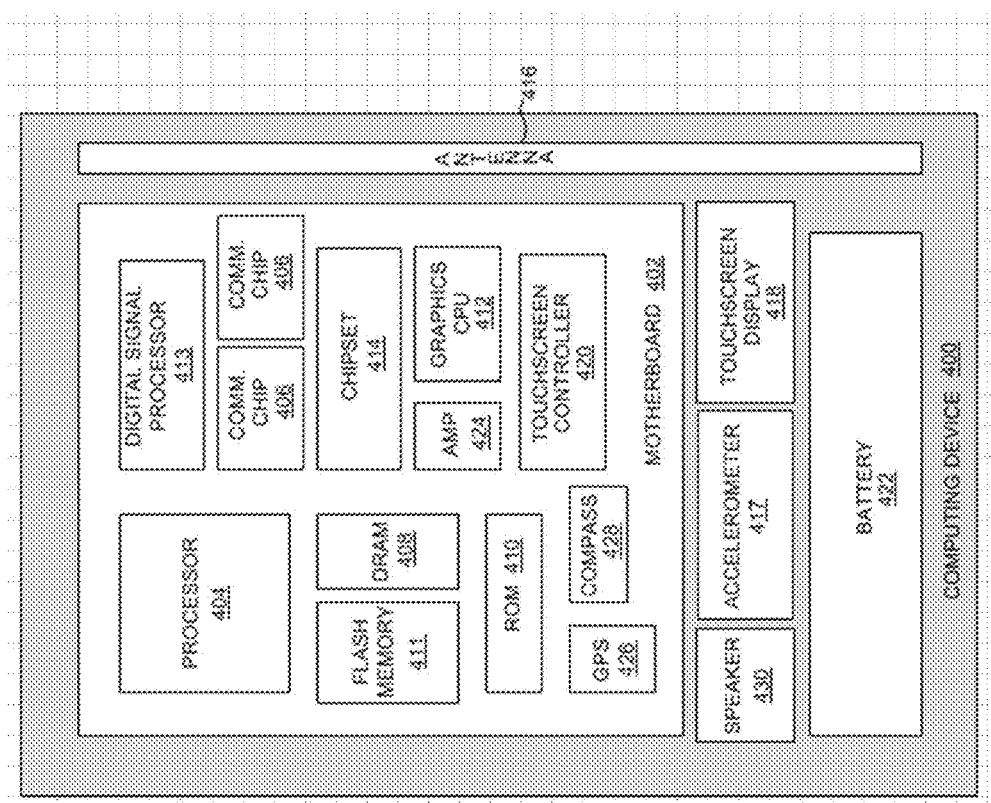
FIG. 4 illustrates an example implementation of a computing device which may support a GUI, in accordance with various embodiments.

FIG. 4 illustrates an example implementation of the computing device 102 of FIG. 1, where a GUI may be used to interact with a user, in accordance with various embodiments. In embodiments, computing device 400 (an implementation of computing device 102) may house a motherboard 402. The motherboard 402 may include a number of components, including but not limited to a processor 404 and at least one communication chip 406. The processor 404 may be physically and electrically coupled to motherboard 402. In some implementations the at least one communication chip 406 may also be physically and electrically coupled to motherboard 402. In further implementations, the communication chip 406 may be part of the processor 404. In alternate embodiments, the above enumerated may be coupled together in alternate manners without employment of motherboard 402.

Depending on its applications, computing device 400 may include other components that may or may not be physically and electrically coupled to motherboard 402. These other components include, but are not limited to, volatile memory (e.g., DRAM 408), non-volatile memory (e.g., ROM 410), flash memory 411, a graphics processor 412, a digital signal processor 413, a crypto processor (not shown), a chipset 414, an antenna 416, a display (not shown), a touchscreen display 418, a touchscreen controller 420, a battery 422, an audio codec (not shown), a video codec (not shown), a power amplifier 424, a global positioning system (GPS) device 426, a compass 428, a sensor 442, an accelerometer, a gyroscope, a speaker, user and away facing optical or electromagnetic image capture components 432, and a mass storage device (such as hard disk drive, compact disk (CD), digital versatile disk (DVD), and so forth).

Figure 2:
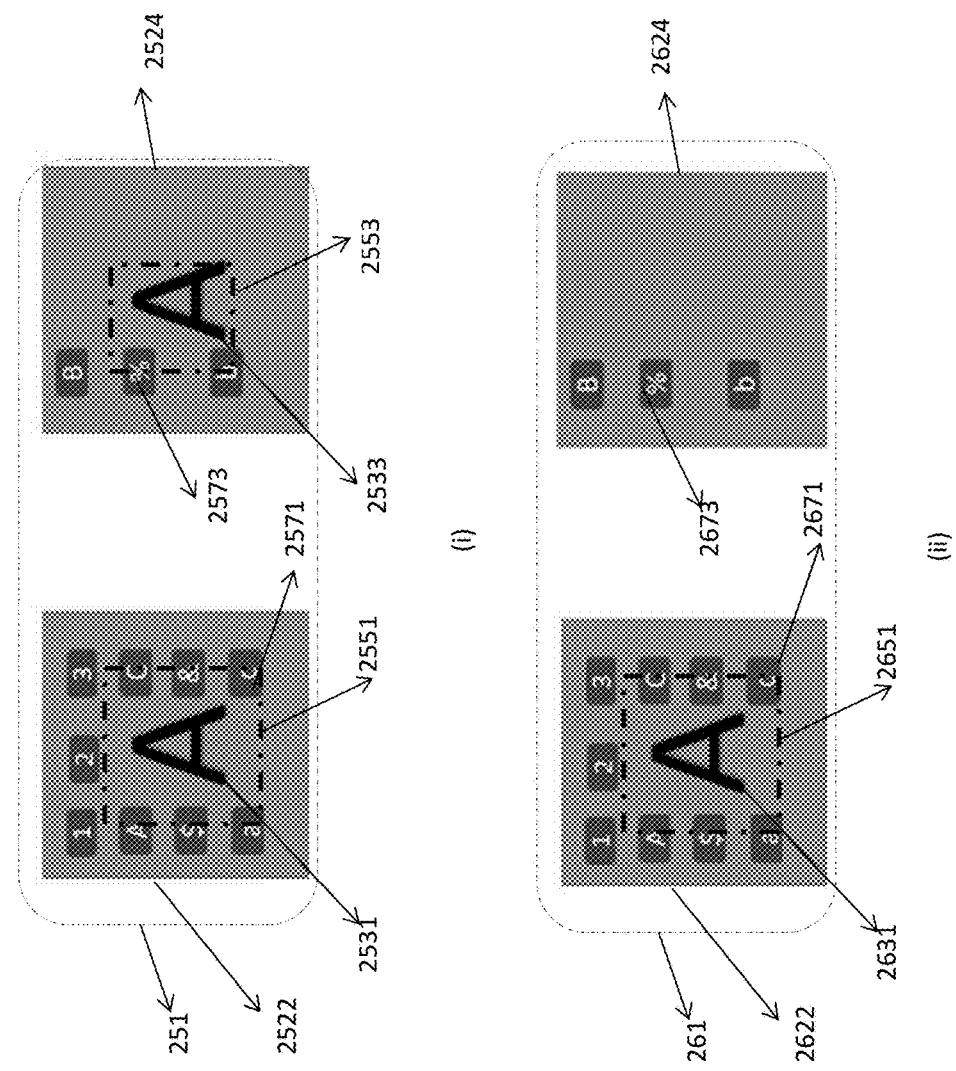

In various embodiments, volatile memory (e.g., DRAM 408), non-volatile memory (e.g., ROM 410), and/or flash memory 411, may include instructions to be executed by processor 404, graphics processor 412, digital signal processor 413, and/or crypto processor, to implement graphics manager 105 to practice various aspects of the methods and apparatuses described earlier with references to FIGS. 1-3 on placements of graphical elements into a GUI in view of ROI.

The communication chip 406 may enable wired and/or wireless communications for the transfer of data to and from the computing device 400 through one or more networks. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 406 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 400 may include a plurality of communication chips 406. For instance, a first communication chip 406 may be dedicated to shorter range wireless communications such as Wi-Fi and Bluetooth and a second communication chip 406 may be dedicated to longer range wireless communications such as GPS, EDGE, GPRS, CDMA, WiMAX, LTE, Ev-DO, and others. The communication chip 406 may also include an integrated circuit die packaged within the communication chip 406.

The processor 404 of the computing device 400 may include an integrated circuit die packaged within the processor 404. The term "processor" may refer to any device or portion of a device (e.g., a processor core) that processes electronic data from registers and/or memory to transform that electronic data into other electronic data that may be stored in registers and/or memory.

In further implementations, another component housed within the computing device 400 may contain an integrated circuit die that may include one or more devices, such as processor cores, cache and one or more memory controllers.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Example 1 may include an apparatus comprising: a memory; a processor circuitry coupled with the memory; and a graphical user interface (GUI) manager to be loaded into the memory and executed by the processor circuitry to: receive a designation of a region of interest, ROI, of a first graphical element of a GUI to be rendered on a display device; and place a second graphical element into the GUI in view of the ROI of the first graphical element.

Example 2 may include the apparatus of example 1 and/or some other examples herein, wherein to place the second graphical element into the GUI in view of the ROI of the first graphical element, the GUI manager is to place the second graphical element into the GUI in a manner where the ROI of the first graphical element remains visible.

Example 3 may include the apparatus of example 1 and/or some other examples herein, wherein the first and second graphical elements are first and second components of a frame of the GUI, and the GUI manager is a layout manger; and wherein to place the second graphical element into the GUI in view of the ROI of the first graphical element, the layout manager is to place the second component into the frame in a manner where the ROI of the first component remains visible.

Example 4 may include the apparatus of example 3 and/or some other examples herein, wherein the first component is located at a first screen area, and the layout manager places the second component at a second screen area partially overlapping the first screen area, while the ROI of the first component remains visible.

Example 5 may include the apparatus of example 3 and/or some other examples herein, wherein the first and second components are located in different layers of the frame.

Example 6 may include the apparatus of example 3 and/or some other examples herein, wherein the first component is located in a background layer or a screensaver layer of the frame.

Example 7 may include the apparatus of example 3 and/or some other examples herein, wherein the layout manager is a border layout manager, a box layout manager, a flow layout manager, a grid bag layout manager, or a grid layout manager.

Example 8 may include the apparatus of example 1 and/or some other examples herein, wherein the first graphical element is an image, and the ROI is a head of a person in the image.

Example 9 may include the apparatus of example 1 and/or some other examples herein, wherein the ROI is of a shape of a circle, a rectangle, or a triangle.

Example 10 may include the apparatus of example 1 and/or some other examples herein, wherein the second graphical element is a window, an icon, a menu, a pointer, a widget, a shortcut, a label, a folder, a toolbar, or a button.

Example 11 may include the apparatus of example 1 and/or some other examples herein, wherein to receive, the GUI manager is to receive a relative position of the ROI with respect to the first graphical element via metadata associated with the first graphical element.

Example 12 may include the apparatus of example 1 and/or some other examples herein, wherein the processor circuitry and the display device is a part of a desktop, a laptop, a mobile device, a music player, or a smart phone.

Example 13 may include the apparatus of example 1 and/or some other examples herein, wherein the GUI manager is a part of an operating system of a computing device.

Example 14 may include the apparatus of example 1 and/or some other examples herein, wherein the ROI is a first ROI, the first graphical element has a second ROI, and the GUI manager is to place the second graphical element further in view of the second ROI.

Example 15 may include the apparatus of example 1 and/or some other examples herein, wherein a first instance of the first graphical element is located at a first screen area and a second instance of the first graphical element is located at a second screen area on the display device, and wherein the GUI manager is to place the second graphical element in view of the ROI of both instances of the first graphical element.

Example 16 may include the apparatus of example 1 and/or some other examples herein, wherein the display device is a first display device, the GUI spans the first and a second display device, a first instance of the first graphical element is located at a first screen area on the first display device, and a second instance of the first graphical element is located at a second screen area on the second display device; wherein the GUI manager is to further place a third graphical element on a portion of the GUI on the second display device in view of the ROI of the second instance of the first graphical element.

Example 17 may include the apparatus of example 16 and/or some other examples herein, wherein the GUI manager is to place the third graphical element on the portion of the GUI on the second display device in a manner where the ROI of the second instance of the first graphical element remains visible.

Example 18 may include the apparatus of example 1 and/or some other examples herein, wherein the display device is a first display device, the GUI spans the first and a second display device, and the first graphical element is located at a screen area on the first display device, but not at any screen area on the second display device, and wherein the GUI manager is to further place a third graphical element on a portion of the GUI on the second display device independent of the ROI of the first graphical element.

Example 19 may include the apparatus of example 1 and/or some other examples herein, wherein the designation of the ROI of the first graphical element is performed by a user at a time different from a time when the first graphical element is rendered on the display device.

Example 20 may include a method for computing, comprising: receiving, by a graphical user interface (GUI) manager operating on a computing device, a designation of a region of interest, ROI, of a first graphical element of a GUI to be rendered on a display device; rendering, by the GUI manager, the first graphical element on the display device; and placing, by the GUI manager, a second graphical element into the GUI in view of the ROI of the first graphical element.

Example 21 may include the method of example 20 and/or some other examples herein, wherein placing the second graphical element into the GUI in view of the ROI of the first graphical element, the GUI manager is to place the second graphical element into the GUI in a manner where the ROI of the first graphical element remains visible.

Example 22 may include the method of example 20 and/or some other examples herein, wherein the first and second graphical elements are first and second components of a frame of the GUI, and the GUI manager is a layout manger; and wherein placing the second graphical element into the GUI in view of the ROI of the first graphical element, the layout manager is to place the second component into the frame in a manner where the ROI of the first component remains visible.

Example 23 may include the method of example 22 and/or some other examples herein, wherein the first component is located at a first screen area, and the layout manager places the second component at a second screen area partially overlapping the first screen area, while the ROI of the first component remains visible.

Example 24 may include the method of example 22 and/or some other examples herein, wherein the first and second components are located in different layers of the frame.

Example 25 may include the method of example 22 and/or some other examples herein, wherein the first component is located in a background layer or a screensaver layer of the frame.

Example 26 may include the method of example 22 and/or some other examples herein, wherein the layout manager is a border layout manager, a box layout manager, a flow layout manager, a grid bag layout manager, or a grid layout manager.

Example 27 may include the method of example 20 and/or some other examples herein, wherein the first graphical element is an image, and the ROI is a head of a person in the image.

Example 28 may include the method of example 20 and/or some other examples herein, wherein the ROI is of a shape of a circle, a rectangle, or a triangle.

Example 29 may include the method of example 20 and/or some other examples herein, wherein the second graphical element is a window, an icon, a menu, a pointer, a widget, a shortcut, a label, a folder, a toolbar, or a button.

Example 30 may include the method of example 20 and/or some other examples herein, wherein receiving the designation of the ROI, the GUI manager is to receive a relative position of the ROI with respect to the first graphical element via metadata associated with the first graphical element.

Example 31 may include the method of example 20 and/or some other examples herein, wherein the GUI manager is a part of an operating system of a computing device.

Example 32 may include the method of example 31 and/or some other examples herein, wherein the computing device is a desktop, a laptop, a mobile device, a music player, or a smart phone.

Example 33 may include the method of example 20 and/or some other examples herein, wherein the ROI is a first ROI, the first graphical element has a second ROI, and wherein placing the second graphical element is to place the second graphical element further in view of the second ROI.

Example 34 may include the method of example 20 and/or some other examples herein, wherein a first instance of the first graphical element is located at a first screen area and a second instance of the first graphical element is located at a second screen area on the display device, and wherein placing the second graphical element is to place the second graphical element in view of the ROI of both instances of the first graphical element.

Example 35 may include the method of example 20 and/or some other examples herein, wherein the display device is a first display device, the GUI spans the first and a second display device, a first instance of the first graphical element is located at a first screen area on the first display device, and a second instance of the first graphical element is located at a second screen area on the second display device; and the method further comprising: placing a third graphical element on a portion of the GUI on the second display device in view of the ROI of the second instance of the first graphical element.

Example 36 may include the method of example 35 and/or some other examples herein, wherein placing the third graphical element on the portion of the GUI on the second display device is to place the third graphical element on the portion of the GUI on the second display device, while the ROI of the second instance of the first graphical element remains visible.

Example 37 may include the method of example 20 and/or some other examples herein, wherein the display device is a first display device, the GUI spans the first and a second display device, and the first graphical element is located at a screen area on the first display device, but not at any screen area on the second display device, and the method further comprising: placing a third graphical element on a portion of the GUI on the second display device independent of the ROI of the first graphical element.

Example 38 may include the method of example 20 and/or some other examples herein, wherein the designation of the ROI of the first graphical element is performed by a user at a time different from a time when the first graphical element is rendered on the display device.

Example 39 may include a computing device comprising: graphical user interface (GUI) manager means including: means for receiving a designation of a region of interest, ROI, of a first graphical element of a GUI; means for rendering the first graphical element with the ROI on a display device; and means for placing a second graphical element into the GUI in view of the ROI of the first graphical element.

Example 40 may include the computing device of example 39 and/or some other examples herein, wherein the means for placing the second graphical element are for placing the second graphical element into the GUI in a manner where the ROI of the first graphical element remains visible.

Example 41 may include the computing device of example 39 and/or some other examples herein, wherein the first and second graphical elements are first and second components of a frame of the GUI, and the means for placing the second graphical element are a layout manger placing the second component into the frame in a manner where the ROI of the first component remains visible.

Example 42 may include the computing device of example 41 and/or some other examples herein, wherein the first component is located at a first screen area, and the layout manager places the second component at a second screen area partially overlapping the first screen area, while the ROI of the first component remains visible.

Example 43 may include the computing device of example 41 and/or some other examples herein, wherein the first and second components are located in different layers of the frame.

Example 44 may include the computing device of example 41 and/or some other examples herein, wherein the first component is located in a background layer or a screensaver layer of the frame.

Example 45 may include the computing device of example 41 and/or some other examples herein, wherein the layout manager is a border layout manager, a box layout manager, a flow layout manager, a grid bag layout manager, or a grid layout manager.

Example 46 may include the computing device of example 39 and/or some other examples herein, wherein the first graphical element is an image, and the ROI is a head of a person in the image.

Example 47 may include the computing device of example 39 and/or some other examples herein, wherein the ROI is of a shape of a circle, a rectangle, or a triangle.

Example 48 may include the computing device of example 39 and/or some other examples herein, wherein the second graphical element is a window, an icon, a menu, a pointer, a widget, a shortcut, a label, a folder, a toolbar, or a button.

Example 49 may include the computing device of example 39 and/or some other examples herein, wherein the meanings for receiving are a GUI manager receiving a relative position of the ROI with respect to the first graphical element via metadata associated with the first graphical element.

Example 50 may include the computing device of example 39 and/or some other examples herein, wherein the means for receiving and the means for rendering are a part of a desktop, a laptop, a mobile device, a music player, or a smart phone.

Example 51 may include the computing device of example 39 and/or some other examples herein, wherein the GUI manager is a part of an operating system of a computing device.

Example 52 may include the computing device of example 39 and/or some other examples herein, wherein the ROI is a first ROI, the first graphical element has a second ROI, and the means for placing are for placing the second graphical element further in view of the second ROI.

Example 53 may include the computing device of example 39 and/or some other examples herein, wherein a first instance of the first graphical element is located at a first screen area and a second instance of the first graphical element is located at a second screen area on the display device, and the means for placing are for placing the second graphical element in view of the ROI of both instances of the first graphical element.

Example 54 may include the computing device of example 39 and/or some other examples herein, wherein the display device is a first display device, the GUI spans the first and a second display device, a first instance of the first graphical element is located at a first screen area on the first display device, and a second instance of the first graphical element is located at a second screen area on the second display device; and the computing devices further comprising: means for placing a third graphical element on a portion of the GUI on the second display device in view of the ROI of the second instance of the first graphical element.

Example 55 may include the computing device of example 54 and/or some other examples herein, wherein the means for placing the third graphical element are for placing the third graphical element on the portion of the GUI on the second display device in a manner where the ROI of the second instance of the first graphical element remains visible.

Example 56 may include the computing device of example 39 and/or some other examples herein, wherein the display device is a first display device, the GUI spans the first and a second display device, and the first graphical element is located at a screen area on the first display device, but not at any screen area on the second display device, and the computing devices further comprising: means for placing a third graphical element on a portion of the GUI on the second display device independent of the ROI of the first graphical element.

Example 57 may include the computing device of example 39 and/or some other examples herein, wherein the designation of the ROI of the first graphical element is performed by a user at a time different from a time when the first graphical element is rendered on the display device.

Example 58 may include one or more non-transitory computer-readable media comprising instructions that cause a computing device, in response to execution of the instructions by the computing device, to operate a graphical user interface (GUI) manager to: receive a designation of a region of interest, ROI, of a first graphical element of a GUI to be rendered on a display device; and place a second graphical element of into the GUI in view of the ROI of the first graphical element.

Example 59 may include the one or more non-transitory computer-readable media of example 58 and/or some other examples herein, wherein to place the second graphical element into the GUI in view of the ROI of the first graphical element, the GUI manager is to place the second graphical element into the GUI in a manner where the ROI of the first graphical element remains visible.

Example 60 may include the one or more non-transitory computer-readable media of example 58 and/or some other examples herein, wherein the first and second graphical elements are first and second components of a frame of the GUI, and the GUI manager is a layout manger; and wherein to place the second graphical element into the GUI in view of the ROI of the first graphical element, the layout manager is to place the second component into the frame in a manner where the ROI of the first component remains visible.

Example 61 may include the one or more non-transitory computer-readable media of example 60 and/or some other examples herein, wherein the first component is located at a first screen area, and the layout manager places the second component at a second screen area partially overlapping the first screen area, while the ROI of the first component remains visible.

Example 62 may include the one or more non-transitory computer-readable media of example 61 and/or some other examples herein, wherein the first and second components are located in different layers of the frame.

Example 63 may include the one or more non-transitory computer-readable media of example 61 and/or some other examples herein, wherein the first component is located in a background layer or a screensaver layer of the frame.

Example 64 may include the one or more non-transitory computer-readable media of example 61 and/or some other examples herein, wherein the layout manager is a border layout manager, a box layout manager, a flow layout manager, a grid bag layout manager, or a grid layout manager.

Example 65 may include the one or more non-transitory computer-readable media of example 58 and/or some other examples herein, wherein the first graphical element is an image, and the ROI is a head of a person in the image.

Example 66 may include the one or more non-transitory computer-readable media of example 58 and/or some other examples herein, wherein the ROI is of a shape of a circle, a rectangle, or a triangle.

Example 67 may include the one or more non-transitory computer-readable media of example 58 and/or some other examples herein, wherein the second graphical element is a window, an icon, a menu, a pointer, a widget, a shortcut, a label, a folder, a toolbar, or a button.

Example 68 may include the one or more non-transitory computer-readable media of example 58 and/or some other examples herein, wherein to receive the designation is to receive a relative position of the ROI with respect to the first graphical element via metadata associated with the first graphical element.

Example 69 may include the one or more non-transitory computer-readable media of example 58 and/or some other examples herein, wherein the computing device is a desktop, a laptop, a mobile device, a music player, or a smart phone.

Example 70 may include the one or more non-transitory computer-readable media of example 58 and/or some other examples herein, wherein the GUI manager is a part of an operating system of the computing device.

Example 71 may include the one or more non-transitory computer-readable media of example 58 and/or some other examples herein, wherein the ROI is a first ROI, the first graphical element has a second ROI, and the GUI manager is further to: place the second graphical element further in view of the second ROI.

Example 72 may include the one or more non-transitory computer-readable media of example 58 and/or some other examples herein, wherein a first instance of the first graphical element is located at a first screen area and a second instance of the first graphical element is located at a second screen area on the display device, and wherein the GUI manager is to place the second graphical element in view of the ROI of both instances of the first graphical element.

Example 73 may include the one or more non-transitory computer-readable media of example 58 and/or some other examples herein, wherein the display device is a first display device, the GUI spans the first and a second display device, a first instance of the first graphical element is located at a first screen area on the first display device, and a second instance of the first graphical element is located at a second screen area on the second display device; wherein the GUI manager is to further place a third graphical element on a portion of the GUI on the second display device in view of the ROI of the second instance of the first graphical element.

Example 74 may include the one or more non-transitory computer-readable media of example 73 and/or some other examples herein, wherein the GUI manager is to place the third graphical element on the portion of the GUI on the second display device in a manner where the ROI of the second instance of the first graphical element remains visible.

Example 75 may include the one or more non-transitory computer-readable media of example 58 and/or some other examples herein, wherein the display device is a first display device, the GUI spans the first and a second display device, and the first graphical element is located at a screen area on the first display device, but not at any screen area on the second display device, and wherein the GUI manager is to further place a third graphical element on a portion of the GUI on the second display device independent of the ROI of the first graphical element.

Example 76 may include the one or more non-transitory computer-readable media of example 58 and/or some other examples herein, wherein the designation of the ROI of the first graphical element is performed by a user at a time different from a time when the first graphical element is rendered on the display device.

What is claimed is:
1. An apparatus for computing, comprising:
a memory;
a processor circuitry coupled with the memory; and
a graphical user interface (GUI) manager to be loaded into the memory and executed by the processor circuitry to:
receive a designation of a region of interest, ROI, of a first graphical element of a GUI to be rendered on a display device; and
place a second graphical element into the GUI in view of the ROI of the first graphical element, wherein the first graphical element and the second graphical element are located in a frame of the GUI, the frame of the GUI is a border of a window of the GUI that holds all the graphical elements of the GUI in one or more layers of the frame.

2. The apparatus of claim 1, wherein to place the second graphical element into the GUI in view of the ROI of the first graphical element, the GUI manager is to place the second graphical element into the GUI in a manner where the ROI of the first graphical element remains visible.

3. The apparatus of claim 1, wherein the GUI manager is a layout manger; and wherein to place the second graphical element into the GUI in view of the ROI of the first graphical element, the layout manager is to place the second component into the frame in a manner where the ROI of the first component remains visible.

4. The apparatus of claim 3, wherein the first component is located at a first screen area, and the layout manager places the second component at a second screen area partially overlapping the first screen area, while the ROI of the first component remains visible.

5. The apparatus of claim 3, wherein the first component is located in a background layer or a screensaver layer of the frame.

6. The apparatus of claim 3, wherein the layout manager is a border layout manager, a box layout manager, a flow layout manager, a grid bag layout manager, or a grid layout manager.

7. The apparatus of claim 1, wherein a first instance of the first graphical element is located at a first screen area and a second instance of the first graphical element is located at a second screen area on the display device, and
wherein the GUI manager is to place the second graphical element in view of the ROI of both instances of the first graphical element.

8. The apparatus of claim 1, wherein the display device is a first display device, the GUI spans the first and a second display device, a first instance of the first graphical element is located at a first screen area on the first display device, and a second instance of the first graphical element is located at a second screen area on the second display device; wherein the GUI manager is to further place a third graphical element on a portion of the GUI on the second display device in view of the ROI of the second instance of the first graphical element.

9. The apparatus of claim 8, wherein the GUI manager is to place the third graphical element on the portion of the GUI on the second display device in a manner where the ROI of the second instance of the first graphical element remains visible.

10. The apparatus of claim 1, wherein the display device is a first display device, the GUI spans the first and a second display device, and the first graphical element is located at a screen area on the first display device, but not at any screen area on the second display device, and wherein the GUI manager is to further place a third graphical element on a portion of the GUI on the second display device independent of the ROI of the first graphical element.

11. A method for computing, comprising:
receiving, by a graphical user interface (GUI) manager operating on a computing device, a designation of a region of interest, ROI, of a first graphical element of a GUI to be rendered on a display device;
rendering, by the GUI manager, the first graphical element on the display device; and
placing, by the GUI manager, a second graphical element into the GUI in view of the ROI of the first graphical element, wherein the first graphical element and the second graphical element are located in a frame of the GUI, the frame of the GUI is a border of a window of the GUI that holds all the graphical elements of the GUI in one or more layers of the frame.

12. The method of claim 11, wherein the GUI manager is a layout manager; and wherein placing the second graphical element into the GUI in view of the ROI of the first graphical element, the layout manager is to place a second component into the frame in a manner where the ROI of a first component remains visible.

13. The method of claim 12, wherein the first component is located at a first screen area, and the layout manager places the second component at a second screen area partially overlapping the first screen area, while the ROI of the first component remains visible.

14. The method of claim 12, wherein the layout manager is a border layout manager, a box layout manager, a flow layout manager, a grid bag layout manager, or a grid layout manager.

15. The method of claim 11, wherein a first instance of the first graphical element is located at a first screen area and a second instance of the first graphical element is located at a second screen area on the display device, and
wherein placing the second graphical element is to place the second graphical element in view of the ROI of both instances of the first graphical element.

16. The method of claim 11, wherein the display device is a first display device, the GUI spans the first and a second display device, a first instance of the first graphical element is located at a first screen area on the first display device, and a second instance of the first graphical element is located at a second screen area on the second display device; and the method further comprising:
placing a third graphical element on a portion of the GUI on the second display device in view of the ROI of the second instance of the first graphical element.

17. The method of claim 11, wherein the display device is a first display device, the GUI spans the first and a second display device, and the first graphical element is located at a screen area on the first display device, but not at any screen area on the second display device, and the method further comprising:
placing a third graphical element on a portion of the GUI on the second display device independent of the ROI of the first graphical element.

18. One or more non-transitory computer-readable media comprising instructions that cause a computing device, in response to execution of the instructions by the computing device, to operate a graphical user interface (GUI) manager to:
receive a designation of a region of interest, ROI, of a first graphical element of a GUI to be rendered on a display device; and
place a second graphical element into the GUI in view of the ROI of the first graphical element, wherein the first graphical element and the second graphical element are located in a frame of the GUI, the frame of the GUI is a border of a window of the GUI that holds all the graphical elements of the GUI in one or more layers of the frame.

19. The one or more non-transitory computer-readable media of claim 18, wherein the GUI manager is a layout manager; and wherein to place the second graphical element into the GUI in view of the ROI of the first graphical element, the layout manager is to place a second component into the frame in a manner where the ROI of a first component remains visible.

20. The one or more non-transitory computer-readable media of claim 19, wherein the first component is located at a first screen area, and the layout manager places the second component at a second screen area partially overlapping the first screen area, while the ROI of the first component remains visible.

21. The one or more non-transitory computer-readable media of claim 19, wherein the layout manager is a border layout manager, a box layout manager, a flow layout manager, a grid bag layout manager, or a grid layout manager.

22. The one or more non-transitory computer-readable media of claim 18, wherein a first instance of the first graphical element is located at a first screen area and a second instance of the first graphical element is located at a second screen area on the display device, and
wherein the GUI manager is to place the second graphical element in view of the ROI of both instances of the first graphical element.

23. The one or more non-transitory computer-readable media of claim 18, wherein the display device is a first display device, the GUI spans the first and a second display device, a first instance of the first graphical element is located at a first screen area on the first display device, and a second instance of the first graphical element is located at a second screen area on the second display device; wherein the GUI manager is to further place a third graphical element on a portion of the GUI on the second display device in view of the ROI of the second instance of the first graphical element.

24. The one or more non-transitory computer-readable media of claim 18, wherein the display device is a first display device, the GUI spans the first and a second display device, and the first graphical element is located at a screen area on the first display device, but not at any screen area on the second display device, and wherein the GUI manager is to further place a third graphical element on a portion of the GUI on the second display device independent of the ROI of the first graphical element.

* * * * *